H. Conant.
Let-Off Motion.
Nº 27,889.      Patented Apr. 17, 1860.
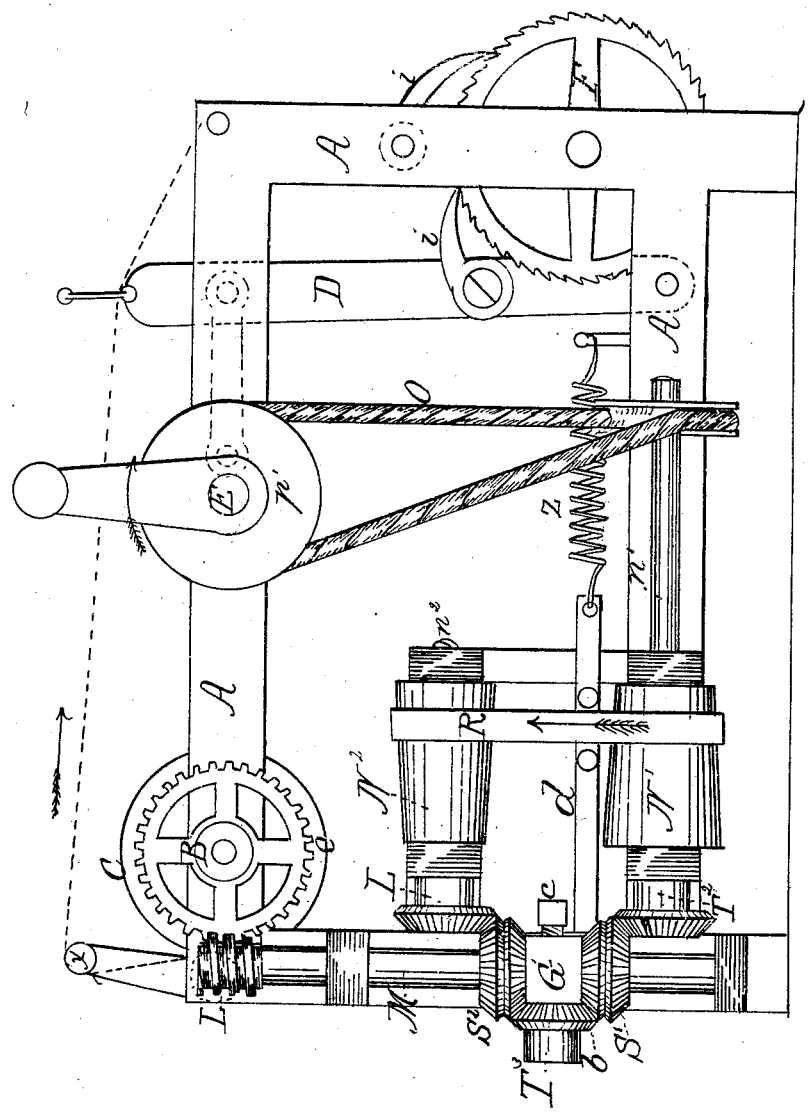
Witnesses
E. B. Sumner
W. W. Arnold
Inventor
Hezekiah Conant

UNITED STATES PATENT OFFICE.

H. CONANT, OF WILLIMANTIC, CONNECTICUT.

LOOM.

Specification of Letters Patent No. 27,889, dated April 17, 1860.

*To all whom it may concern:*

Be it known that I, HEZEKIAH CONANT, residing in the borough of Willimantic, in the town and county of Windham, in the State of Connecticut, have invented a new and useful Improvement in Mechanism for Regulating the Delivery or Letting Off of Warp in Looms for Knitting or Weaving; and I do hereby declare the following to be a clear and accurate description of my invention, reference being had to the drawings herewith presented, which constitute a part of said description.

The nature of my invention consists in combining a belt guide with a yielding or depressible roll, over which the warp passes in weaving (most commonly designated as the whip roll) in such a manner that a belt running upon conical pulleys may be shifted and their relative differences in speed increased or diminished according as the said roll is depressed or elevated by the action of said warp whereby the letting off or delivery of the same is regulated in a superior manner as hereafter described.

The drawing represents an end elevation of a loom for weaving, with my improvement attached.

A, A, is the frame.

B, is a large geared wheel fast to the end of warp beam C, C.

D represents the lathe of the loom, or that part which beats the filling to its place as the shuttle leaves it.

E is the crank shaft which operates the lathe D.

F is a ratchet wheel, which with the pawls $i\ i$ represents the "take-up" motion which is positive and regular in most looms.

L is a worm which engages with gear B and by its motion operates to turn the beam C, C, upon which the warp is wound, the warp being represented in the drawing by a red line.

The shaft M, upon which the worm L, is fastened receives its motion from the combined action of the gears, T' and $T^2$ which are fast upon the two shafts $n'$ and $n^2$ in the following manner: The shaft $n'$ being set in motion by the band O, and pulley $p'$ on crank shaft E imparts motion simultaneously to the double beveled gear S' in one direction and by the means of belt R and cone pulleys and gear T' to the other double beveled gear $S^2$ in a contrary direction, S' and $S^2$ being fitted so as to revolve freely upon the shaft M.

The beveled gear $T^3$ is made so as to revolve freely upon a stud upon one side of the block or cat-head G which is firmly fixed to the shaft M, by set screw $c$ or other similar contrivance and engages with gears S' and $S^2$ above and below, as represented in the drawing.

Now if the wheel $S^2$ be held stationary while S' revolves it is evident that the wheel $T^3$ would travel around upon the face of the wheel $S^2$ and turn the shaft M, with it, at a speed equal to one half that of the wheel S'. Again, if the wheels S' and $S^2$ revolve at the same speed in contrary direction the wheel $T^3$ revolving will have an equal impulse both above and below and will hold the shaft M, stationary, which demonstrates the fact that the shaft M will turn on its axis only when there is a difference in the speed of the two gears S' and $S^2$. Now when the belt R is at the extreme right the cone N' being equal in diameter at that point to cone $N^2$, both shafts revolve at equal rates of speed and consequently no motion is imparted to the shaft M, but when the belt moves to the left, the cone $N^2$, having a smaller, and cone N', a larger corresponding diameter the speed of $S^2$ is increased over that of S' and consequently the shaft M, rotates in a direction corresponding with the greatest amount of impulse.

The warp as it leaves the beam C, C, passes over the rod or roll $x$. This roll, generally denominated the "whip roll," is mounted in a swinging frame or upon levers so as to admit of its moving forward as the warp is made shorter by the process of weaving and by means of a spring like Z, operating upon an arm below the fulcrum is made to press backward and consequently keeps the warp tight. I consider weights properly rigged better adapted for this purpose as the tension is not affected as much by the position of the roll. The frame or levers upon which the roll $x$ is mounted are pivoted near the upper left hand corner behind the worm L and an arm extends downward and is attached to belt guide $d$, near letter $b$ but on the back side of the frame.

Now in process of weaving, if the warp beam were held stationary the roll $x$ would be pressed forward by the shortening of the warp (and if the belt R is moved to the extreme right, where the cones are of equal diameters, such would be the case as I have shown above) this would consequently move the belt guide $d$ to the left, and the belt following its motion would accelerate the speed of shaft $n^2$ and set the shaft M, in motion which operating by means of the worm L and gear B would commence to unwind the warp, and the depression of the roll $x$ would continue until the speed of the letting off was equal to the taking up, when the depression would no further continue only as the diameter of the roll of the warp grew smaller by being unwound; which would require a slight acceleration only of the motion of the beam, the position of the whip-roll governing the speed thereof until the whole warp is unwound and I have found out from experience that a pair of cones three inches in length is amply sufficient to let off a warp whose outside diameter is eighteen inches and inside five inches and even to greater extremes.

In nearly all devices for letting off warps heretofore contrived, the shaking of the loom occasioned by the action of the lathe and picker motions has been a serious obstacle; and also the constant jerking of the warp upon the whip roll prevents their regularity of action, and being also generally operated by a ratchet and pawl the motion is intermittent and unequal while by my improvement the jerking of the warp does not in the least affect the regularity, neither does the shaking and jarring of the looms motion affect the certainty of the delivery or letting-off; as the belt R yields only to the general pressure and is not at all affected by short spasmodic jerks of the warp upon the whip roll.

I do not claim mounting a whip roll upon levers or in a swinging frame or affixing weights or springs to make it bear against the warp and yield to the depression thereof, neither do I claim the manner of giving motion to a shaft from the difference of speed of two others, nor do I claim broadly, regulating the delivery of the warp by the strain or action thereof to cause a roll to vibrate, but I do claim—

The combination of a whip roll of a loom with a belt guide so that a belt may be shifted and the relative speed of a pair of cone pulleys may be made to differ as and whenever said roll is depressed as set forth.

HEZEKIAH CONANT.

In presence of—
E. B. SUMNER,
W. W. ARNOLD.